(12) United States Patent
Backs

(10) Patent No.: US 7,309,933 B2
(45) Date of Patent: Dec. 18, 2007

(54) VIBRATOR FOR ACTING ON AN OBJECT IN A PREDETERMINED DIRECTION AND APPARATUS FOR PRODUCING CONCRETE BLOCKS

(75) Inventor: Ulrich Backs, Kalldof (DE)

(73) Assignee: Hess Maschinenfabrik GmbH & Co. KG, Burbach-Wahlbach (DE)

( * ) Notice: Subject to any disclaimer, the term of this patent is extended or adjusted under 35 U.S.C. 154(b) by 332 days.

(21) Appl. No.: 11/056,541

(22) Filed: Feb. 11, 2005

(65) Prior Publication Data

US 2005/0189823 A1   Sep. 1, 2005

(30) Foreign Application Priority Data

Feb. 26, 2004   (DE) ...................... 10 2004 009 251

(51) Int. Cl.
 *H02K 41/00* (2006.01)
(52) U.S. Cl. ............................. 310/12; 310/29; 310/36
(58) Field of Classification Search ................. 310/12, 310/29, 36, 120
 See application file for complete search history.

(56) References Cited

U.S. PATENT DOCUMENTS

| | | | |
|---|---|---|---|
| 3,173,664 A | | 3/1965 | Isaacson et al. |
| 4,868,431 A | | 9/1989 | Karita et al. |
| 5,682,132 A | * | 10/1997 | Hiroyoshi et al. ........ 340/407.1 |
| 5,936,516 A | | 8/1999 | Narea et al. |
| 5,959,939 A | | 9/1999 | Tengham et al. |
| 6,289,662 B1 | * | 9/2001 | Dinkelmann et al. ......... 57/299 |
| 7,078,832 B2 | * | 7/2006 | Inagaki et al. ................. 310/12 |
| 7,078,833 B2 | * | 7/2006 | Xu ............................... 310/14 |

FOREIGN PATENT DOCUMENTS

| | | |
|---|---|---|
| DE | 819161 | 7/1949 |
| DE | 953890 | 7/1956 |
| DE | 2621181 | 5/1976 |
| DE | 69021087 T2 | 5/1990 |
| DE | 19921145 A1 | 11/2000 |
| DE | 10026985 A1 | 12/2001 |
| DE | 10129468 A1 | 6/2002 |
| EP | 1116524 | 2/2001 |
| EP | 1187509 | 3/2002 |
| FR | 2715424 | 7/1995 |
| GB | 664941 | 4/1949 |

OTHER PUBLICATIONS

Syed A. Nasar, et al., Linear Electric Motors: Theory, Design, and Practical Applications, Linear Motion Oscillators, Chapter 8, pp. 233-243, 1987 (Publication date).

* cited by examiner

*Primary Examiner*—Dang Le
*Assistant Examiner*—Nguyen Hanh
(74) *Attorney, Agent, or Firm*—Townsend and Townsend and Crew LLP

(57) ABSTRACT

The invention relates to a vibrator for acting on an object in a predetermined direction, comprising a casing and two identical, synchronously driven, electric linear motor coils arranged mirror-symmetrically therein, between which coils there is an armature which can be moved to and fro in an oscillatory fashion by driving the linear motor coils appropriately in their longitudinal direction, the armature being mounted via wires arranged under spring bias in the casing, and also to an apparatus for producing concrete blocks which uses vibrators of this type.

6 Claims, 3 Drawing Sheets

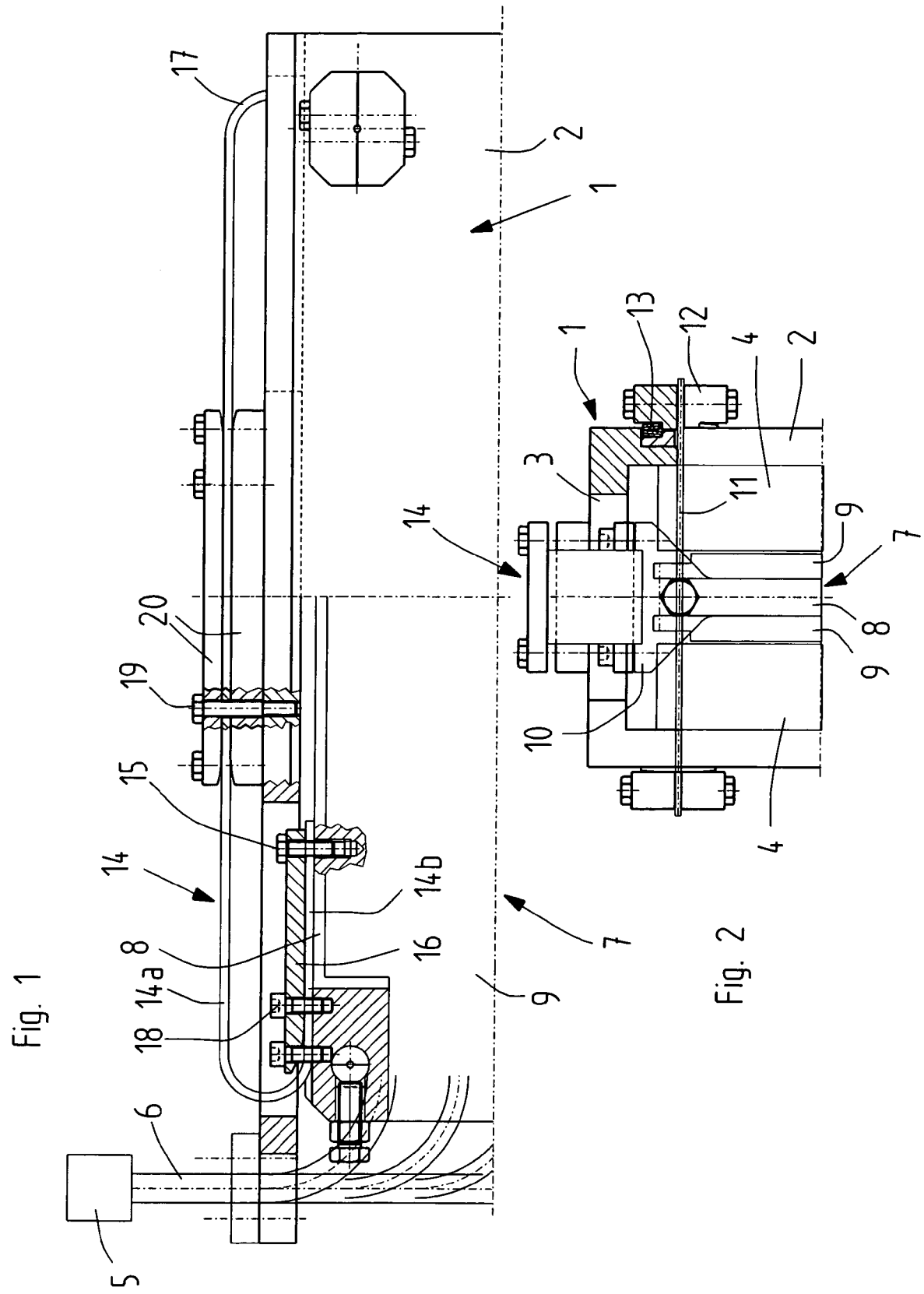

VIBRATOR FOR ACTING ON AN OBJECT IN A PREDETERMINED DIRECTION AND APPARATUS FOR PRODUCING CONCRETE BLOCKS

FIELD OF THE INVENTION

The invention relates to a vibrator for acting on an object in a predetermined direction and an apparatus for producing concrete blocks by acting on a mould in a vibratory manner.

BACKGROUND OF THE INVENTION

During the production of concrete blocks, it is known inter alia to make use of a mould which is vibrated by means of vibrators during and/or after being filled with damp concrete mortar, the vibrators acting on the side walls of the mould. In this case, the vibrators used are imbalance exciters, which necessitate a complicated and a voluminous construction and are highly susceptible to wear at high vibration frequencies.

A large number of designs of linear motors are known in which linear motor coils and an armature moved by the latter are provided but, as a rule, roller bearings are used for the armature, cf. U.S. Pat. No. 4,868,431. Such linear motors are designed for large strokes of the armature. Apart from the fact that mountings of this type only permit a movement of the armature in a predetermined direction, for high stroke frequencies at small strokes, such as are needed in the case of vibrators, roller mountings of this type are unsuitable since, because of the mass moment of inertia, the rollers then cannot follow the movement of the armature, so that the result is quickly correspondingly high wear because of the lack of lubrication.

The use of ball bearings, as they are described in the German Patent No. 953 890, or sliding bearings, as they are described in WO 91/17874, leads to corresponding problems.

SUMMARY OF THE INVENTION

It is an object of the invention to provide a vibrator for acting on an object in a predetermined direction, of which the design permits a movement of the armature in two mutually perpendicular directions.

It is a further object of the invention to provide a vibrator which permits operation at high stroke frequency with low wear.

It is still a further object of the invention to provide an apparatus for producing concrete blocks using a vibrational motion of a mould taking up a corresponding amount of mortar.

According to the present invention, a vibrator comprising a casing and two identical, synchronously driven, electric linear motor coils arranged mirror-symmetrically therein is provided, between which coils there is an armature which can be moved to and fro in an oscillatory fashion by driving the linear motor coils appropriately in their longitudinal direction, the armature being mounted via wires arranged under spring bias in the casing. Because of the free suspension, the armature can be moved at high frequency and with short strokes and both in the direction of the linear motor coils and in the direction perpendicular thereto, in order that, with a connection (for example with a force-transmitting and/or form-fitting engagement) to an object to be vibrated, that is to say moved in a direction other than the vibration direction, the armature can follow the said object, so that in this way no wear is caused. In general, the result is a compact design little susceptible to wear.

According to the invention, an apparatus for producing concrete blocks for constructional purposes is provided, said apparatus comprising a mould having side walls and a vibration device for the mould for vibrating the mould horizontally, said vibration device comprising at least one pair of vibrators acting in a force-transmitting manner on opposite side walls of the mould.

Further objects, advantages and embodiments of the invention can be gathered from the following description.

BRIEF DESCRIPTION OF THE DRAWINGS

The invention will be explained in more detail below using exemplary embodiments illustrated in the appended drawings.

FIG. 1 shows an embodiment of a vibrator, halved, schematized and partly cut open.

FIG. 2 shows a front view of the vibrator from FIG. 1, halved and partly in section.

DETAILED DESCRIPTION OF THE PREFERRED EMBODIMENTS

Figure 3:
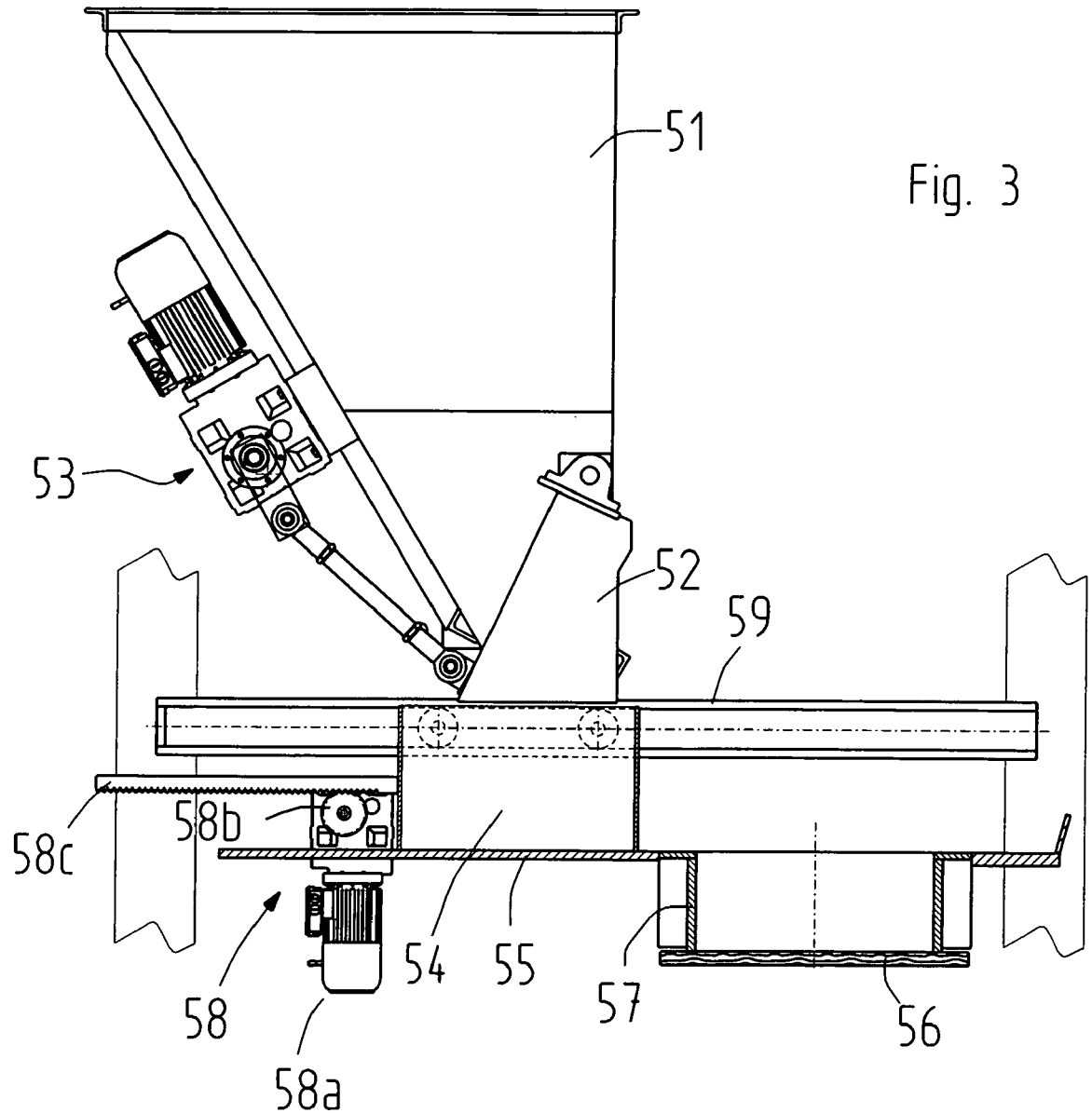
FIG. 3 shows a filling device for a concrete block machine, schematically in side view.

The embodiment of a vibrator illustrated in FIGS. 1 and 2 comprises a substantially box-shaped casing 1 made of non-magnetic or non-magnetizable material such as an aluminium alloy and having side walls 2, which are connected to one another by walls 3 to form an elongated box. On the inner sides of the side walls 2, arranged mirror-symmetrically in relation to each other as primary parts of a linear motor, there are linear motor coils 4 which can be driven and accordingly acted on electrically synchronously in the longitudinal direction of their arrangement via appropriate driving means 5 and electrical feed lines 6, in order to cause an armature 7 arranged between the linear motor coils 4 as the secondary part of the linear motor to oscillate to and fro.

The armature 7 comprises a carrier 8 made of a non-magnetic or non-magnetizable material such as an aluminium alloy which, on both sides, in each case has a permanent magnetic plate 9 which extends substantially over the area of the linear motor coils 4, is fixed to the carrier 8 and can consist of a permanent magnet or can be assembled from a large number of permanent magnets. In addition, on its opposite longitudinal sides, the carrier 8 is in each case provided with a fixing flange 10 at the ends.

Between the armature 7 and the linear motor coils 4 there is a narrow air gap of, for example, 0.5 mm. In order to maintain this, that is to say to keep the armature 7 centred between the linear motor coils 4 as the armature 7 oscillates to and fro, in the exemplary embodiment illustrated the armature 7 is held by a plurality of wires 11 (in particular made of spring steel wire), which extend through appropriate holes in the armature 7 and in the side walls 2 of the housing 1 and, on the outside of the side walls 2, are clamped in clamping sleeves 12 with the interposition of disc spring packs 13. This type of suspension is suitable in particular for small strokes of the armature 7 in the region of a few mm, in which mounting via antifriction elements is disadvantageous because of the lack of lubrication and, in addition, for relatively high frequencies of, for example, 30 to 50 Hz for the armature stroke. Mounting the armature 7 via antifriction elements in order to guide the armature 7 with respect to the linear motor coils 4 becomes expedient only when the strokes of the armature 7 reach at least approximately one antifriction element revolution.

Furthermore, in each case an operating spring 14 formed as a leaf spring extending in the direction of movement of the armature 7 is expediently fixed to the armature 7 on both sides and is formed in the shape of a bow which has a central limb 14a and two limbs 14b parallel thereto. The latter are fixed to the carrier 8 by means of screws 15 and, in addition, are clamped in by means of a clamping plate 16 on the carrier 8 adjacent to the curved connecting section 17 between the central limb 14a and the respective limb 14b, the clamping plate 16 being fixed to the fixing flange 10 by means of screws 18. As a result, the limbs 14b belong to the oscillating part, while the connecting section 17 and the central limb 14a, which is fixed to the casing 1 by means of screws 19 and clamping plates 20, form two sprung sections which are in each case stressed and unstressed appropriately as the armature 7 oscillates to and fro.

In this case, the operating springs 14 are expediently matched in such a way that, in the mass/spring system which acts in the direction of movement of the armature, they continue to oscillate on their own when the desired stroke amplitude has been reached and virtually only the energy loss resulting from spring deformation has to be topped up but, on the other hand, not all of the acceleration energy has to be produced via the linear motor coils 4.

In order to keep the expenditure on energy and therefore also the overall sizes of the components of the linear motors small, when the vibrator is switched on, the stroke amplitude of the armature 7 is built up in that the linear motor coils 4 always apply sufficient energy that, during each stroke, in addition to tensioning the operating springs 14, a small additional stroke of the armature 7 takes place until the desired stroke amplitude has been reached.

Vibrators of the type described above can be used advantageously in a concrete block machine.

The latter can have a filling device as illustrated in FIG. 3. This comprises a hopper 51 with a funnel-like outlet and a flap 52 attached to the hopper 51 (or having a plurality of funnel-like outlets in each case closed by a flap), which can be moved between an open and a closed position by means of a drive 53 comprising a linkage acting on the flap 52. Underneath the hopper 51 there is a filling carriage 54 which is open at the top and the bottom and which can be moved over a table plate 55 between a position under the flap 52 and a position above a mould 57 located on a fabrication base 56 for concrete blocks, by means of a linear drive 58, for example comprising an electric motor 58a arranged on the filling carriage 54 and a pinion 58b which is driven by the said electric motor 58a and which engages in a rack 58c that is parallel to the table plate 55, or comprising a piston/cylinder drive or a crank drive. The filling carriage 54 is guided in this case by a horizontal guide 59, preferably arranged on both sides of the filling carriage 54.

The fabrication base 56 is located above a vibratory table 60 which can be set oscillating vertically and which is mounted within a frame 61 on damping elements 62, so that the vibrations originating from the vibratory table 60 are in practice not transmitted to the frame 61 and the foundations. During the vibrations, the vibratory table 60 strikes the fabrication base 56 from below, preferably via impact bars 60a, so that the said fabrication base 56 is moved up and down under the action of the force of gravity.

Arranged in the frame 61 is a plunger 63 which can be moved vertically and via which concrete mortar 64 in the mould 57 can be compacted. The plunger 63 can be moved by means of at least two synchronized motors 65 (four such motors 65 in the exemplary embodiment illustrated). This can be done via pinions 66 and racks 67, as illustrated by way of example, which are connected to a top load 68 such that they can move in any direction, for example via a ball joint, and on the underside of which the plunger 63 is located.

Because the result is irregular filling, mainly in the direction of travel of the filling carriage 54, if only two motors 65 are used, these should expediently be arranged one after another in the direction of travel of the filling carriage 54. However, this also includes the fact that they can be offset in relation to the direction of travel, for example to act substantially on the diagonally opposite corners of the mould 57. In the case of four motors 65 corresponding to the exemplary embodiment illustrated, these are arranged one after another in pairs in the direction of travel of the filling carriage 54. However, it is also possible to use three motors 65, for example a motor 65 which acts on the side of the mould 57 that is reached first by the filling carriage 54 during filling, while the two others are arranged adjacently, transversely with respect to the direction of travel, and act in the region of the side of the mould 57 reached last by the filling carriage 54.

The motors 65 can be electric or hydraulic motors. They are respectively coupled to a torque sensor 69, which, in the case of an electric motor 65, is expediently a current sensor and, in the case of a hydraulic motor 65, is a pressure sensor. The torque sensors 69 are coupled to a control system 70 for the drive of the filling carriage 54. By this means, during production, depending on the difference between the measured values from the torque sensor 69 and a predetermined reference value representing the desired power consumption, which is generally identical for all the motors 65, the filling is changed by changing the speed of travel or the profile of the speed of travel of the filling carriage 54 during its forward and/or reverse travel and/or by changing its travel displacement (that is to say the extent to which the filling carriage 54 moves over the mould 57 or beyond the latter), in such a way that the result is always a substantially uniform filling and therefore a virtually constant product quality.

Figure 4:
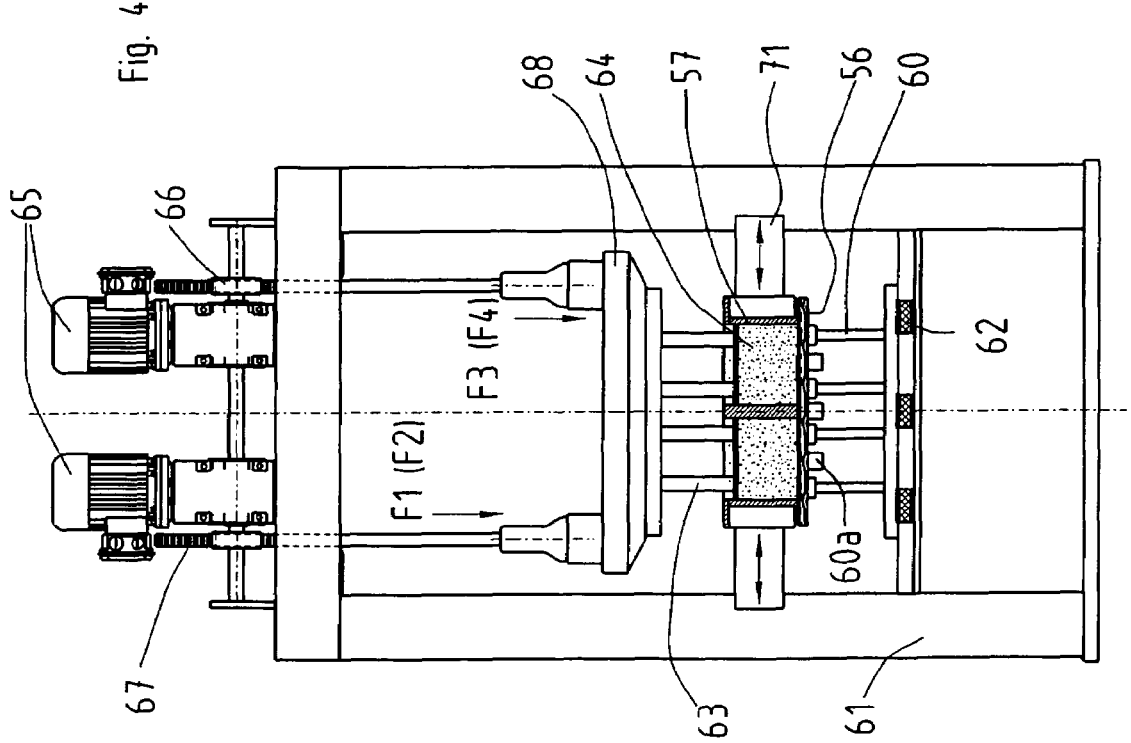

Accordingly, since measurements are carried out during each filling and compaction cycle, in the event of different torques (caused by different forces $F_1$, $F_2$, $F_3$, $F_4$ acting on the plunger 63, cf. FIG. 4), a correction to the concrete block height can be made immediately.

Figure 5:
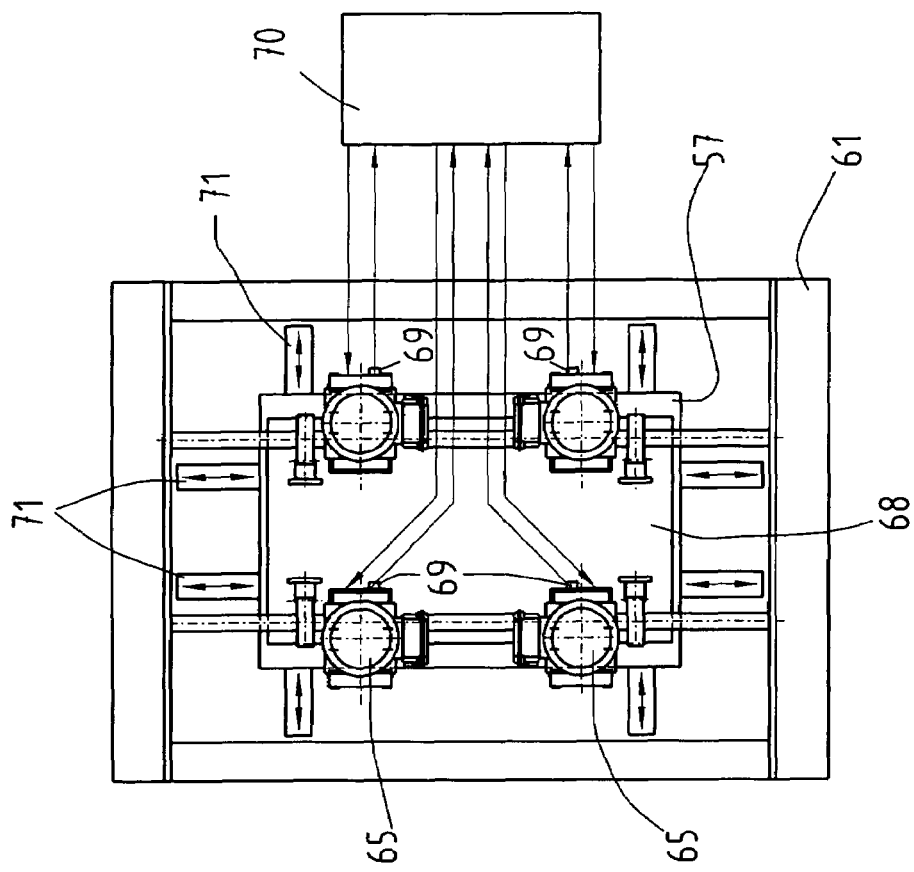
FIGS. 4 and 5 show a compaction station for a concrete block machine, schematically in front view and in plan view, respectively.

As FIG. 5 illustrates, at least two vibrators 71 according to the invention act on the mould 57 in pairs in a force-transmitting manner, possibly even without the use of the vibratory table 60, in order to carry out the compaction of the damp concrete mortar in the mould 57 by means of lateral vibration, for example at a frequency in the range from 30 to 50 Hz and with an amplitude of a few mm. In the exemplary embodiment illustrated, eight vibrators 71 are distributed on the circumference of the mould 57 (here in each case two arranged diagonally in a respective corner region).

The use of the vibrators 71 according to the invention not only permits good compaction but also rapid changing of the mould 57, since, because they act in a force-transmitting manner, the vibrators 71 leave a clearance from the mould 57 in their neutral initial position or possibly also in their position pulled back from the mould 57, so that the latter can readily be removed quickly and replaced in this state.

Furthermore, in the case of compaction by means of vibration through the vibratory table and/or the vibrators 71, equalisation of the elasticity of the mechanical equipment, but also of the concrete blocks to be formed, takes place, in that the drive, by means of that motor 65 which is assigned the greater power or the greater torque, runs synchronously with the other motor or motors 65. This avoids the situation in which the top-load side of the plunger 63 sinks in the poorer filled region as compared with the well-filled region. The synchronization of the motors 65 is carried out electronically, for example via an appropriate displacement measurement.

The vibrators 71 can also be used as filling aids by being operated during the filling of the mould 57. In this case, operated as horizontal vibrators, the vibrators 71 lead to the wall of the mould 57 striking the concrete mortar 64 put in, which means that the sides of the concrete blocks produced are improved. At the same time, by controlling the force exerted by the vibrators 71, their vibration amplitude and frequency, the filling is improved and made uniform.

While the invention has been shwon and described with reference to preferred embodiments, it should be apparent to one of ordinary skill in the art that many changes and modifications may be made without departing from the spirit and scope of the invention as defined in the claims.

I claim:

1. A vibrator for acting on an object in a predetermined direction, comprising:
    a casing;
    two identical, synchronously driven, electric linear motor coils arranged mirror-symmetrically in the casing;
    wherein between the coils there is an armature moveable to and from in an oscillatory fashion by corresponding driving the linear motor coils in the longitudinal direction of the motor coils; and
    wherein the armature is mounted via wires arranged under spring bias in the casing;
    wherein the armature is biased in both stroke directions by means of at least one operating spring; and
    wherein the at least one operating spring is formed in the manner of a bow and is arranged in the direction of movement of the armature, its free limb substantially parallel to a central limb being fixed to the armature and the central limb being fixed to the casing.

2. The vibrator according to claim 1, wherein the wires hold the armature centered between the linear motor coils.

3. The vibrator according to claim 1, wherein the wires are clamped in clamping sleeves at the ends with the interposition of disc springs.

4. The vibrator according to claim 1, wherein the at least one operating spring is coordinated in such a way that, in the mass/spring system which acts in the direction of movement of the armature, it continues to oscillate on its own when the desired stroke amplitude has been reached and virtually only the energy loss resulting from spring deformation has to be topped up.

5. The vibrator according to claim 1, wherein the armature comprises a carrier and two identical permanent magnetic plates which are fixed to both sides of the carrier.

6. The vibrator according to claim 1, for acting on a wall of a mould for compacting a granular material, in particular a damp concrete mortar.

* * * * *